May 27, 1952 G. K. TEAL 2,598,317
PREPARATION OF TWO-SIDED MOSAIC SCREENS
Filed Dec. 29, 1948 3 Sheets-Sheet 1

INVENTOR
G. K. TEAL
BY
Hugh S. Wentz
ATTORNEY

May 27, 1952     G. K. TEAL     2,598,317
PREPARATION OF TWO-SIDED MOSAIC SCREENS
Filed Dec. 29, 1948     3 Sheets—Sheet 2
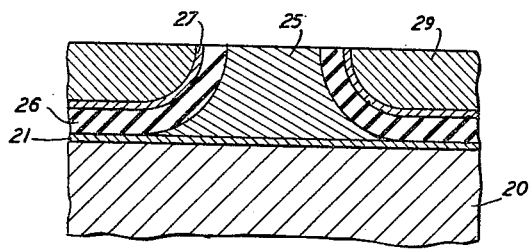
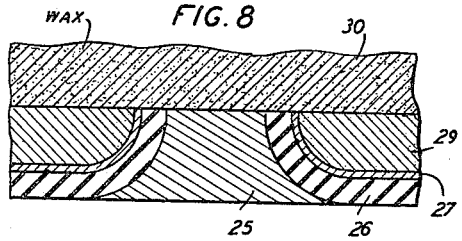
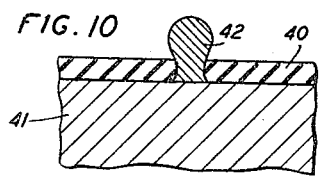
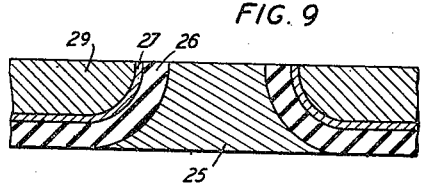
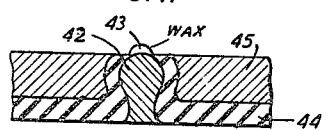
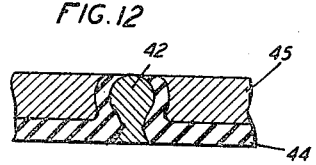
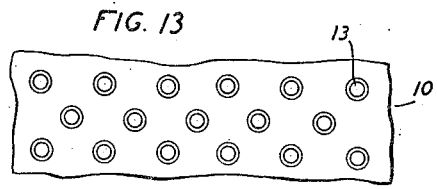
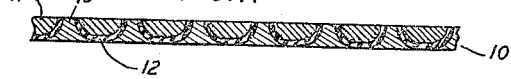
INVENTOR
G. K. TEAL
BY
Hugh S. Wertz
ATTORNEY May 27, 1952 — G. K. TEAL — 2,598,317
PREPARATION OF TWO-SIDED MOSAIC SCREENS
Filed Dec. 29, 1948 — 3 Sheets-Sheet 3

INVENTOR
G. K. TEAL
BY
ATTORNEY

Patented May 27, 1952

2,598,317

UNITED STATES PATENT OFFICE 2,598,317

PREPARATION OF TWO-SIDED MOSAIC SCREENS

Gordon K. Teal, Summit, N. J., assignor to Bell Telephone Laboratories, Incorporated, New York, N. Y., a corporation of New York Application December 29, 1948, Serial No. 67,913

2 Claims. (Cl. 117—33.2)

This invention relates to electro-optical devices and more specifically to methods of making target or screen structures for use in television transmitter tubes.

It has long been recognized in the development of electron camera tubes for generating picture signals at a television transmitting station that there are many advantages in projecting an electron image of the object for transmission onto one side of the screen of the tube and scanning the opposite side of the screen with a cathode ray beam formed in the tube. An example of a camera tube employing such a "two-sided" target or screen is the so-called "image orthicon" tube described in an article entitled "The Image Orthicon—A Sensitive Television Pick-Up Tube" by Albert Rose, Paul K. Weimer, and Harold B. Law, appearing in the July 1946 issue of the Proceedings of the I. R. E., beginning on page 424. The two-sided target makes possible the separation of charging and discharging processes so that the sensitizing procedure and electric fields appropriate to each can be utilized in the tube without mutual interference. The target must conduct charges between its two sides or surfaces but not along either surface. Moreover, it should have a conducting element therein or nearby to act as the common capacitor plate for the separate picture elements. It has been found very difficult to construct satisfactorily commercial targets of this type.

It is an object of the present invention to provide novel and improved methods for making two-sided electron camera tube targets which have a large number of elemental discrete conducting elements per square inch.

In accordance with the invention, so-called "inverted" methods of making a metallic screen are used, in each of which the metal plugs frequently found in two-sided targets of this type are prepared first and a screen is then built around them, rather than the more usual procedure in which the screen is made first and the plugs placed or formed in it. This general procedure seems especially well adapted to making very fine grained mosaics.

In one exemplary method in accordance with the invention, a thin film of nickel or other suitable metal is evaporated upon a flexible sheet of copper or other material that can be removed by etching. A perforated nickel screen is then superimposed upon the film. Nickel deposits are formed by evaporation in the holes of the screen. The nickel screen is stripped off the unit, leaving nickel posts or plugs adhering to the thin nickel film on the copper base. Screens are then built up around the nickel plugs. This and other exemplary methods, all of them "inverted" methods, are described in detail below.

The invention will be more readily understood by referring to the following description taken in connection with the accompanying drawings forming a part thereof, in which:

Figs. 1 to 9, inclusive, show various steps in a process, in accordance with the invention, of making a two-sided screen or target structure for use in television transmitter tubes;

Figs. 10 to 12, inclusive, show various steps in an alternative method of making such a target;

Fig. 13 is a top view of a schematic representation in greatly enlarged form of a portion of a target made in accordance with the method of the invention illustrated in Figs. 1 to 9, inclusive;

Fig. 14 is a sectional side view of said portion of the target;

Figure 21:
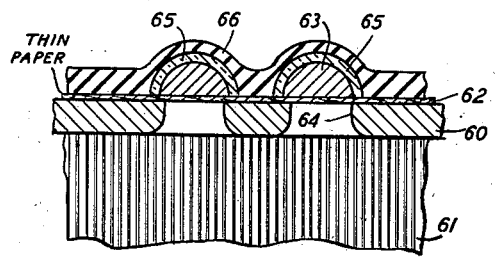
Figure 22:
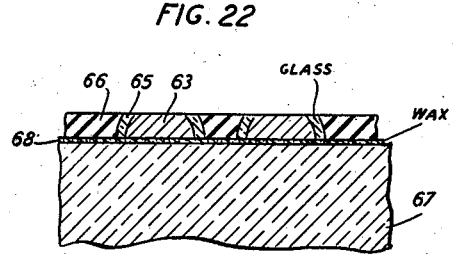

Figs. 15 to 20, inclusive, illustrate various steps in another alternative method of making a two-sided mosaic screen or target; and Figs. 21 and 22 illustrate steps in still another method of making such screens.

Referring more particularly to the drawings, Figs. 13 and 14 show, by way of example for purposes of illustration, portions of a two-sided mosaic target suitable for use in certain television transmitting tubes such as, for example, the image orthicon briefly referred to above. This target 10 comprises a thin metallic screen 11 of a suitable material such as nickel, having a large number of holes to the linear inch, such as, for example, four hundred per inch or more. One surface, such as the bottom surface in the view of Fig. 14, and the interior of all the apertures, are coated with an insulating material 12. The interior of all of these apertures is filled with metallic plugs 13. Successive steps in the preparation of the screen or target 10 will be easily understood by referring to Figs. 1 to 9, inclusive, in each of which the structure around one aperture is represented schematically.

Figure 1:
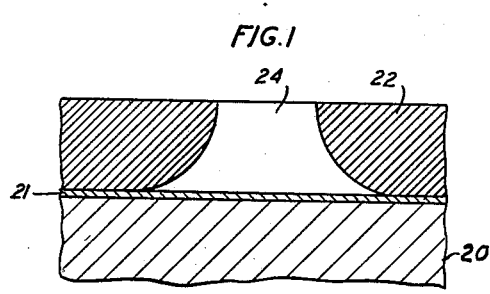
Figure 2:
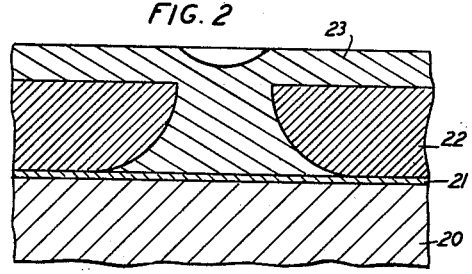

Referring now to Fig. 1, it will be noted that there has been shown in greatly enlarged form a section of a sheet 20 of a flexible material, such as copper, for example, which can be removed by etching, upon which is coated a thin film 21 of nickel, or other suitable material, and a perforated metal screen 22. The thin film 21 is evaporated upon the flexible sheet 20 and the perforated nickel screen 22 is superimposed on the film. A thin film 23 of nickel, as shown in Fig. 2, is then evaporated upon the unit so as to form nickel deposits in the holes 24 of the screen. If necessary, a film of sodium chloride can be evaporated upon the screen to keep the evaporated nickel from adhering to it. The nickel screen is then stripped from the unit, leaving nickel posts 25 (see Fig. 3) adhering to the thin nickel film 21 on the copper base 20.

Figure 3:
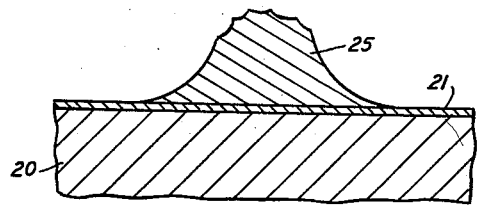
Figure 4:
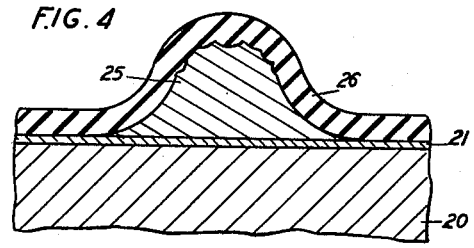

A film of magnesium or cryolite is then evaporated upon the arrangement shown in Fig. 3. This thin film in the embodiment in which magnesium is used is converted to magnesium oxide by heating in an oxygen atmosphere to produce the insulating film 26 shown in Fig. 4. The cryolite is, of course, an insulating material so it can be used to form the film 26 without an oxidation step. Next, a thin film 27 of nickel or other suitable metal is evaporated on the insulating coating 26, as shown in Fig. 5.

Figure 5:
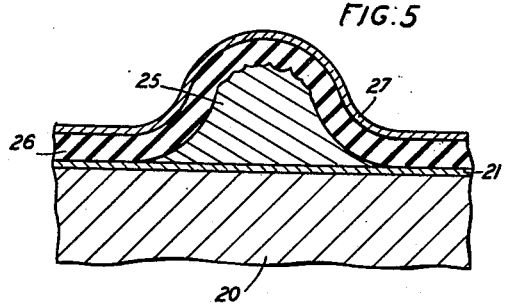
Figure 6:
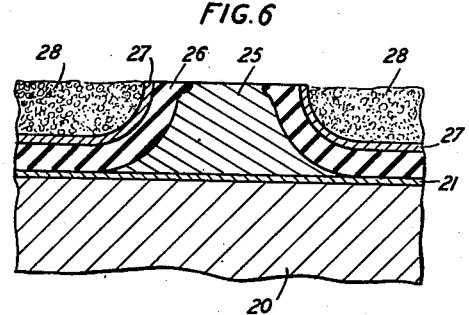

The tops of the covered nickel posts 25 of Fig. 5 are shaved off as indicated in Fig. 6. Nickel oxide dust 28 is then shaken into the depressions of the screen. The nickel oxide 28 in Fig. 6 is reduced to nickel by heating it in a hydrogen atmosphere, or by any other suitable means, to produce the nickel filling 29 shown in Fig. 7. A heavy wax support 30 is then applied to the top of the film as shown in Fig. 8. The copper support 20 of Fig. 7 and the preceding figures is dissolved with an etching fluid and the nickel film 21 is ground off. The wax support 30 is then dissolved off with a suitable solvent, such as carbon tetrachloride, to produce the screen, one elemental portion of which is shown in Fig. 9, and a comparable larger portion of which to a smaller scale is shown in Figs. 13 and 14.

Another process is illustrated in Figs. 10 to 12, inclusive, which process, like that shown in Figs. 1 to 9, inclusive, is an "inverted" method in that the plugs are made first and a metal screen is formed around them. Reference will first be made to Fig. 10. A thin film 40 of asphaltum, or similar compound, is prepared on a metal plate 41. The film 40 is punctured with high voltage sparks in such a way that the film 40 is uniformly pierced over the entire surface. Metal plugs 42 are then electroplated into the holes of the asphaltum film producing the result shown (with respect to one plug only) in Fig. 10. The asphaltum is dissolved in a suitable solvent and the tops of the plugs are coated with wax 43. An insulator 44 is then deposited around the plugs and the metal supports by cataphoresis or other suitable process. A conducting film 45 of suitable metal, such as nickel, is then evaporated on the insulator 44 and the surfaces burnished to remove the film on the wax point 43. A non-conducting ink is then redeposited on the points.

A nickel screen is electroplated onto the evaporated film, and the metal support 41 and the wax 43 are dissolved to obtain the two-sided mosaic, one portion of which is shown in Fig. 12. This procedure is especially advantageous in that it allows the electroplating to proceed without a potential drop through the insulating material. Many other methods do not possess this advantage, resulting in metal filaments being plated into the pores of the insulator, thereby shorting out the plugs and the screen.

Figure 15:
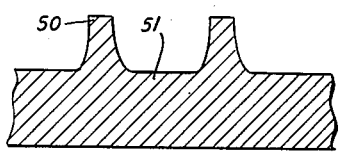

Another process is illustrated in Figs. 15 to 20, inclusive. In this method also, the process is an "inverted screen method" in that the conducting metal plugs are first formed and insulating and metal screens are formed around them by subsequent operations. As shown in Fig. 15, the metal posts 50 may be formed on a copper plate 51 by standard photoengraving methods with light hardened gelatine films, by removal of the unhardened gelatine, inking of the hardened gelatine and deep etching of the copper with ferric chloride etch solution.

Figure 16:
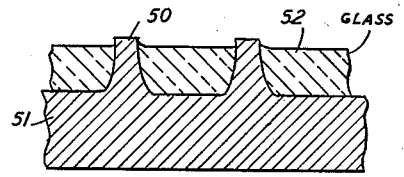
Figure 17:
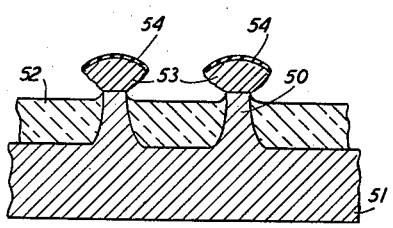

A second step in this process is the formation of a glass screen 52 around the copper posts 50 as shown in Fig. 16. The glass is added to the surface by insufflation followed by fusing of the glass particles. The traces of glass on top of the posts 50 can be readily removed by grinding. The posts 50 are then enlarged by electroplating heads 53 thereon, and the heads 53 are inked by application of protecting ink 54 with a gelatine roller. The inked, enlarged posts are shown in Fig. 17.

Figure 18:
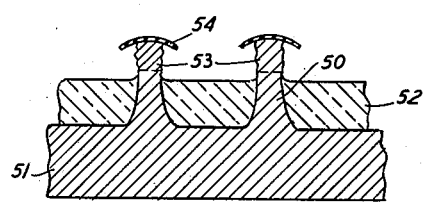
Figure 19:
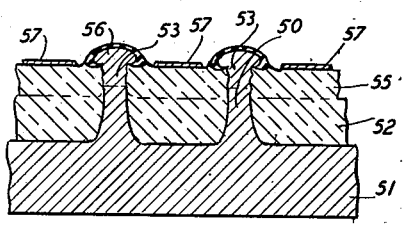
Figure 20:
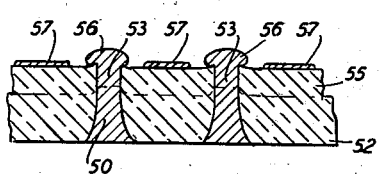

The diameters of the heads 53 of the posts 50 are then reduced by further etching, as shown in Fig. 18, and the etching ink 54 removed with suitable solvent, such as toluene. A second layer of glass 55 is added by insufflation and fusing and etching ink 56, of one of several satisfactory types which are readily available commercially, is applied to the heads enlarged after formation of the second glass layer, as shown in Fig. 19. It has been found that this ink and also some other materials such as, for example, "flexalyn" (substantially, diethylene glycol diabietate), and for some metals, asphaltum and picein, act as reflectors of evaporated metal vapors to such an extent that vaporization of aluminum or silver onto the inked structure in Fig. 19 prevents the condensation of metal vapor on the inked portions but permits its ready condensation on the uninked portions, thus giving a metal screen 57 on the surface of the glass surrounding the individual posts 53 but completely insulated from them. The final steps in the process are the removal of the etching ink with suitable reagents, such as hot benzene, toluene, or sulfuric acid, and removal of the base plate copper 51 by grinding or by etching with ferric chloride etching solution, thus giving the two-sided mosaic shown in Fig. 20.

If desired, the mosaic structure can be formed entirely by the filter method, as illustrated by Figs. 21 and 22. In this process, a master metallic screen 60 (such as nickel or copper, for example) is placed on a filter plate 61 and filter paper 62 is placed on it. Copper oxide suspension in water is poured on the assembly and small mounds 63 of solid are built above each of the holes 64 in the screen. These are washed and a glass suspension added to form a layer 65 of glass over the copper oxide mounds 63. Another layer 66 of copper oxide is then added from aqueous suspension by filtering so as to fill in between the separated mounds. The mosaic filter "cake" (portion above the filter paper 62 in Fig. 21) is then removed from the screen and is heated in a reducing atmosphere of hydrogen or carbon monoxide to reduce the copper oxide to metallic copper and to sinter or fuse the glass. The metal assembly is then mounted on a glass or metal support 67 with sealing wax 68 and the surface ground off to give the two-sided mosaic shown in Fig. 22 and comprising copper plugs 63 separated from a copper screen 66 by fused glass 65.

Various other alternative steps and procedures are, of course, possible without departing from the spirit of the invention, the scope of which is pointed out in the claims.

What is claimed is:

1. The method of manufacturing a two-sided mosaic screen which comprises placing an apertured screen member on a support, forming metal plugs in the apertures of said screen, stripping the apertured screen member from the plugs, insulating the exposed portions of said plugs, filling the region between the insulated plugs with a metallic oxide, reducing the metallic oxide to metal to form a conducting screen between the insulated plugs, removing enough of the insulating layer from the top of said insulated plugs to expose a portion of the plugs, and removing the support.

2. The method of manufacturing two-sided mosaic screens which comprises forming conducting plugs on a base member, covering the plugs with an insulating layer, evaporating metal over the insulating layer, shaving the tops of the conducting plugs to remove the insulating and evaporated layers and expose the tops of said plugs, filling the region between the insulated plugs with a metallic oxide, reducing the metallic oxide to metal to form a conducting screen between the insulated plugs, and removing the base member.

GORDON K. TEAL.

REFERENCES CITED

The following references are of record in the file of this patent:

UNITED STATES PATENTS

| Number | Name | Date |
|---|---|---|
| 2,162,808 | Gallup | June 20, 1939 |
| 2,175,701 | Rose | Oct. 10, 1939 |
| 2,193,101 | Knoll | Mar. 12, 1940 |
| 2,455,513 | McGee | Dec. 7, 1948 |